United States Patent
Wang et al.

(10) Patent No.: US 9,075,768 B2
(45) Date of Patent: Jul. 7, 2015

(54) HIERARCHICAL MULTI-CORE PROCESSOR AND METHOD OF PROGRAMMING FOR EFFICIENT DATA PROCESSING

(71) Applicant: AXIS SEMICONDUCTOR, INC., Boxborough, MA (US)

(72) Inventors: Xiaolin Wang, Concord, MA (US); Qian Wu, Redwood City, CA (US); Ben Marshall, Stow, MA (US); John Eppling, Acton, MA (US); Jie Sun, Sudbury, MA (US)

(73) Assignee: RS STATA LLC, Waltham, MA (US)

( * ) Notice: Subject to any disclaimer, the term of this patent is extended or adjusted under 35 U.S.C. 154(b) by 501 days.

(21) Appl. No.: 13/658,141

(22) Filed: Oct. 23, 2012

(65) Prior Publication Data
US 2013/0138919 A1    May 30, 2013

Related U.S. Application Data

(60) Provisional application No. 61/564,970, filed on Nov. 30, 2011.

(51) Int. Cl.
  *G06F 9/38* (2006.01)
  *G06F 15/173* (2006.01)
  *G06F 15/80* (2006.01)
  *G06F 9/00* (2006.01)

(52) U.S. Cl.
  CPC ...... *G06F 15/17362* (2013.01); *G06F 15/8023* (2013.01)

(58) Field of Classification Search
  None
  See application file for complete search history.

(56) References Cited

U.S. PATENT DOCUMENTS

| | | |
|---|---|---|
| 2003/0088610 A1 | 5/2003 | Kohn et al. |
| 2008/0133885 A1 | 6/2008 | Forsyth |
| 2009/0024836 A1 | 1/2009 | Shen et al. |
| 2011/0010481 A1* | 1/2011 | Hamadani et al. ............ 710/313 |

FOREIGN PATENT DOCUMENTS

JP    2010079622 A    4/2010

OTHER PUBLICATIONS

PCT Search Report & Written Opinion for PCT Appl. No. PCT/US2012/061442, dated Feb. 20, 2013, 9 pages.

* cited by examiner

*Primary Examiner* — Scott Sun
(74) *Attorney, Agent, or Firm* — Maine Cernota & Rardin

(57) ABSTRACT

A multi-core processor includes a tree-like structure having a plurality of computing cores arranged in hierarchical levels, the cores all having the same logical architecture. Each core can include computing, interconnecting, and/or storage elements. The functionality of an individual element can be supplied by an entire core in a lower level. A method for programming the processor includes hierarchically decomposing an application into interconnected sub-functions, mapping the sub-functions onto groups of cores at appropriate levels of the processor, and interconnecting the mapped sub-functions so as to hierarchically compose the complete application. Sub-functions can be sequential, concurrent, and/or pipelined. Interconnections can be static or dynamically switchable under program control. Interconnect elements can also be used to implement flow control as needed in pipelined operations to maintain data coherency. The decomposing and mapping process can be iterated on sub-functions so as to optimize load balancing, software performance, and hardware efficiency.

21 Claims, 17 Drawing Sheets

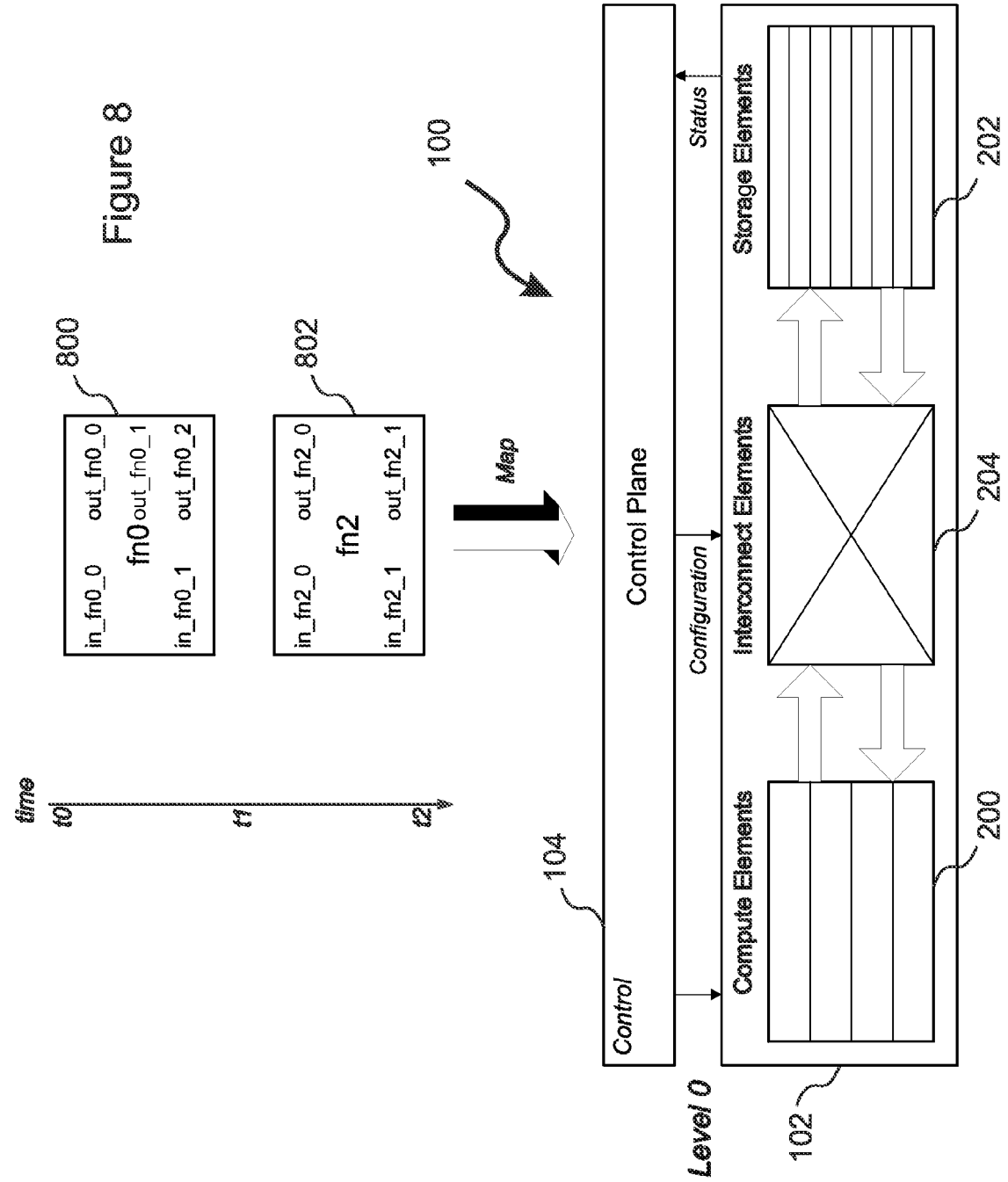

HIERARCHICAL MULTI-CORE PROCESSOR AND METHOD OF PROGRAMMING FOR EFFICIENT DATA PROCESSING

RELATED APPLICATIONS

This application claims the benefit of U.S. Provisional Application No. 61/564,970, filed Nov. 30, 2011, which is herein incorporated by reference in its entirety for all purposes.

FIELD OF THE INVENTION

The invention relates to microprocessor designs and programming methods, and more particularly, to multi-core processor designs and programming methods for efficient data processing by a multi-core processor.

BACKGROUND OF THE INVENTION

A growing need exists for hardware designs that can process data more rapidly, and for programming methods that can make optimal use of processor resources. This growing demand for processing speed is due, at least in part, to an expanding demand for "real time" computing devices, which are used in a wide variety of fields, such as telecommunications, entertainment, gaming, and other local and internet-driven applications.

Although general purpose processing "cores" used in computing devices have become faster and more efficient, it is difficult if not impossible for a single, general purpose processor, or "core," to meet the computing needs of many real-time devices. Instead, "multi-core" processors are widely used for these applications. Some multi-core processors are highly flexible and adaptable, such as dual-core and quad-core general purpose processors used in personal computers, as well as other processors that include a plurality of general purpose cores. However, these designs are not practical for many real-time high-speed and/or low-power applications.

Other designs, such as pipeline processors and "field-programmable gate arrays" (FPGA's), include specialized cores that provide greater speed while retaining a certain degree of flexibility and adaptability. Still other designs include cores that are very fast but somewhat rigid in their applications, such as "digital signal processors" (DSP's) and "application-specific integrated circuits" (ASIC's).

In general, existing solutions offer a range of trade-offs between speed on the one hand and adaptability and flexibility on the other hand. Optimal device speed is generally achieved when the architecture of the processor is designed and configured specifically for the intended purpose, and the software is written to take maximum advantage of the specialized hardware. However, this approach does not allow for amortization of design costs over a plurality of different applications, nor does it provide for product evolution as new requirements are recognized and new applications are conceived. This approach is also problematic when the intended device is required to perform many different functions.

What is needed, therefore, is a multi-core processor design and a corresponding method of programming the processor that will provide high speed data processing while also being highly programmable and flexible for optimal use in multi-purpose devices and for adaptability as new requirements and new applications arise.

SUMMARY OF THE INVENTION

One general aspect of the present invention is a multi-core processor that includes a tree-like structure having a plurality of computing cores or "planes" arranged in hierarchical levels. Each computing plane can include up to three types of elements, namely computing elements, interconnecting elements, and storage elements. The functionalities of individual elements in a computing plane can be supplied by entire computing planes located in the next-lower level of the hierarchy. The entire processor therefore includes a nested set of computing planes, each being self-controlled and each having the same logical architecture.

Another general aspect of the present invention is a method for efficiently programming the multi-core processor described above. The hardware architecture of the processor lends itself naturally to the mapping of functions and sub-functions included in an application. An application algorithm is hierarchically decomposed into interconnected sub-functions having data inputs and outputs. The sub-functions are then mapped onto groups of the programmable computing planes at appropriate levels of the processor, and the interconnect resources are used to hierarchically compose the mapped sub-functions so as to form the complete application program. The interconnect mechanism is selected based on parallel processing construct and execution throughput. The interconnect channels are also used to implement flow control as needed in pipelined operations so as to adjust the execution throughput based on the input data and thereby maintain data coherency.

This process of decomposing all or part of an application and mapping its sub-functions to different levels and different partitions of programmable hardware resources is iterated as needed, so as to optimize load balancing and so as to optimize software performance and hardware efficiency.

A first general aspect of the present invention is a multi-core processor that includes a plurality of processing cores, referred to herein as computing planes, the computing planes being arranged in a hierarchy of levels including a highest level and a lowest level, each of the levels including at least one computing plane, each of the computing planes including a control plane and an associated datapath, each of the control planes including a sequencing instruction memory that is able to store configuration and control information applicable to its associated data path, the configuration information including instructions that control manipulation and routing of data by its associated datapath, each of the control planes being able to receive status information from its associated data path, and being able to provide configuration and control information to its associated data path, each of the datapaths including at least one data input, at least one data output, and at least one element, the element being one of a compute element that is able to manipulate data, an interconnect element that is able to route data, and a storage element that is able to store data, and for at least one of the elements that is in a level above the lowest level, the functionality of the element being provided by a computing plane in a level below the level of the element.

In embodiments, at least one of the compute elements includes an internal buffer register that is able to provide temporary storage for intermediate results.

In various embodiments at least one of the storage elements is able to perform at least one data processing function. In some of these embodiments the data processing function is computing an address from data, rounding of data, saturating of data, or adding or subtracting of two consecutive data inputs In certain embodiments at least one of the interconnect elements is able to form a static connection between two other elements. In some embodiments at least one of the interconnect elements is able to form dynamic connections between pairs of other elements, the dynamic connections being changeable under control of the configuration instructions supplied by the control plane.

In other embodiments at least one of the interconnect elements includes both a signal transmission channel and a data transmission channel, the signal transmission channel being able to transmit a flow control signal in parallel with data transmitted by the data transmission channel, the flow control signal being usable for controlling timing of the flow of data from the data transmission channel.

A second general aspect of the present invention is a method for programming the processor described in the first general aspect to perform a large algorithmic function by mapping the algorithmic function onto the computing planes of the processor, where the method includes partitioning the large algorithmic function into a first layer of sub-functions with data flow between the sub-functions and associated flow control, if one of the sub-functions is not suitable for mapping onto a computing plane of the processor, partitioning the sub-function into a lower layer of sub-functions having data flow between the sub-functions and associated flow control, repeating the step of partitioning the sub-functions into lower layers of sub-functions until all of the lowest level sub-functions are suitable for mapping onto computing planes of the processor, allocating processor time slots and hardware resources to the sub-functions so as to approximately match the processor resources with relative computational and data flow complexities of the sub-functions, and configuring interconnects of the processor according to the data flows between the sub-functions.

Embodiments further include configuring at least some of the interconnects for data transmission with flow control so as to maintain synchronicity of data during execution of the algorithmic function. Some embodiments further include appending null operations to at least one of the sub-functions so as to eliminate a data dependency of an execution time of the sub-function. In other embodiments the steps of partitioning the large algorithmic function and partitioning the sub-functions are carried out by an automatic software tool.

In various embodiments, the step of partitioning the sub function includes partitioning any sub-function having a data dependent execution time into sub-functions that do not have data dependent execution times.

In certain embodiments allocating processor time slots and hardware resources to a hierarchy of sub-functions includes selecting a level of the processor to be a highest level of allocation to the hierarchy of sub-functions and mapping each of the sub-functions in the hierarchy onto a computing plane that is at a level of the processor at the same offset below the highest level as the offset of the sub-function below the highest layer of the sub-functions in the hierarchy.

Various embodiments further include repeating the step of allocating processor time slots and hardware resources so as to achieve load balancing of the hardware resources.

In certain embodiments configuring the interconnects of the processor according to the data flows between the sub-functions includes combining sub-functions having fixed execution times and providing flow control mechanisms so as to compose functions having data-dependent execution times. Some of these embodiments further include estimating the data-dependent execution times based on an input data range and the data flow pattern. And some of these embodiments further include estimating at least one of an upper bound, a lower bound, and a distribution of the execution times.

In various embodiments configuring the interconnects of the processor according to the data flows between the sub-functions includes combining sub-functions according to at least one of sequential composition, concurrent composition, and pipelined composition.

In certain embodiments configuring the interconnects of the processor according to the data flows between the sub-functions includes using buffer storage to absorb a difference between a rate of data production of a first element and a rate of data consumption of a second element. In some of these embodiments the buffer storage is configured to produce a "back pressure" signal when an amount of data stored in the buffer storage exceeds a specified watermark amount, the back pressure signal causing the first element to temporarily stop producing output data.

And in various embodiments the step of allocating processor time slots and hardware resources to the sub-functions further includes using a scheduling tool to schedule overlapping execution of sub-function epilogues and prologues when possible.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 8 is a functional diagram illustrating the allocation of two different sub-functions to the same computing plane during different time slots;

DETAILED DESCRIPTION

Figure 1A:
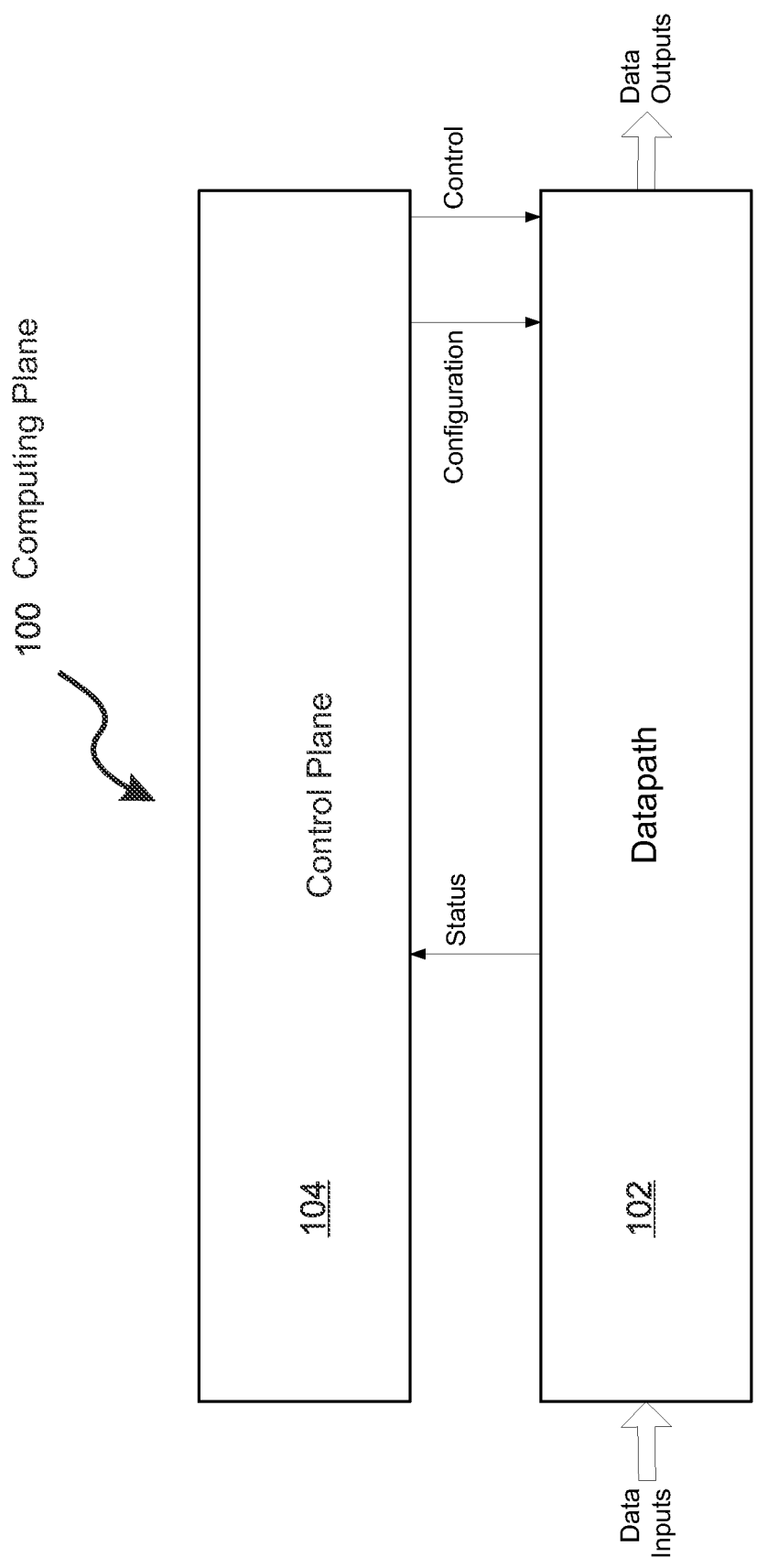
FIG. 1A is a functional diagram illustrating the basic structure of computing planes of the present invention.
Figure 1B:
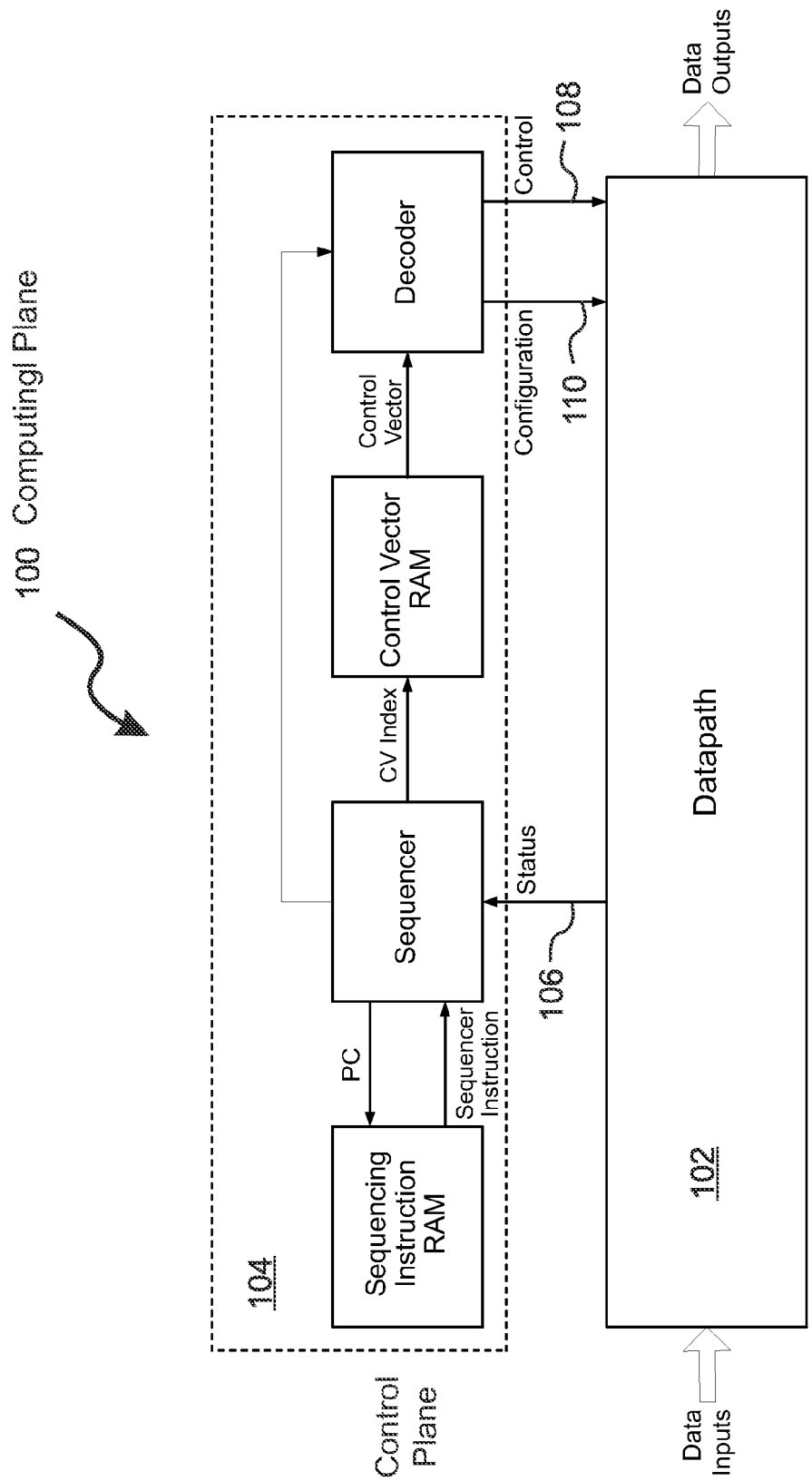
FIG. 1B is a functional diagram illustrating the structure of a control plane in an embodiment of the present invention.

One general aspect of the present invention is a multi-core processor that includes a tree-like structure having a plurality of computing cores or "planes" arranged in hierarchical levels. Each of the planes of the present invention has the generic structure illustrated in FIG. 1A. For each computing plane 100 data flows through a data path 102 while configuration and control signals are provided by a corresponding control plane 104. As is illustrated in FIG. 1B, the control plane 104 receives status bits 106 from the datapath 102. Depending on the received status bits, the control plane 104 sends control bits 108 to the datapath 102 for control and synchronization of an executing program and configuration bits 110 to the datapath 102 for specification of hardware operations.

Note that that the datapath 102 includes multiple elements, each possibly having the same control structure. This structure repeats at each level.

Figure 2:
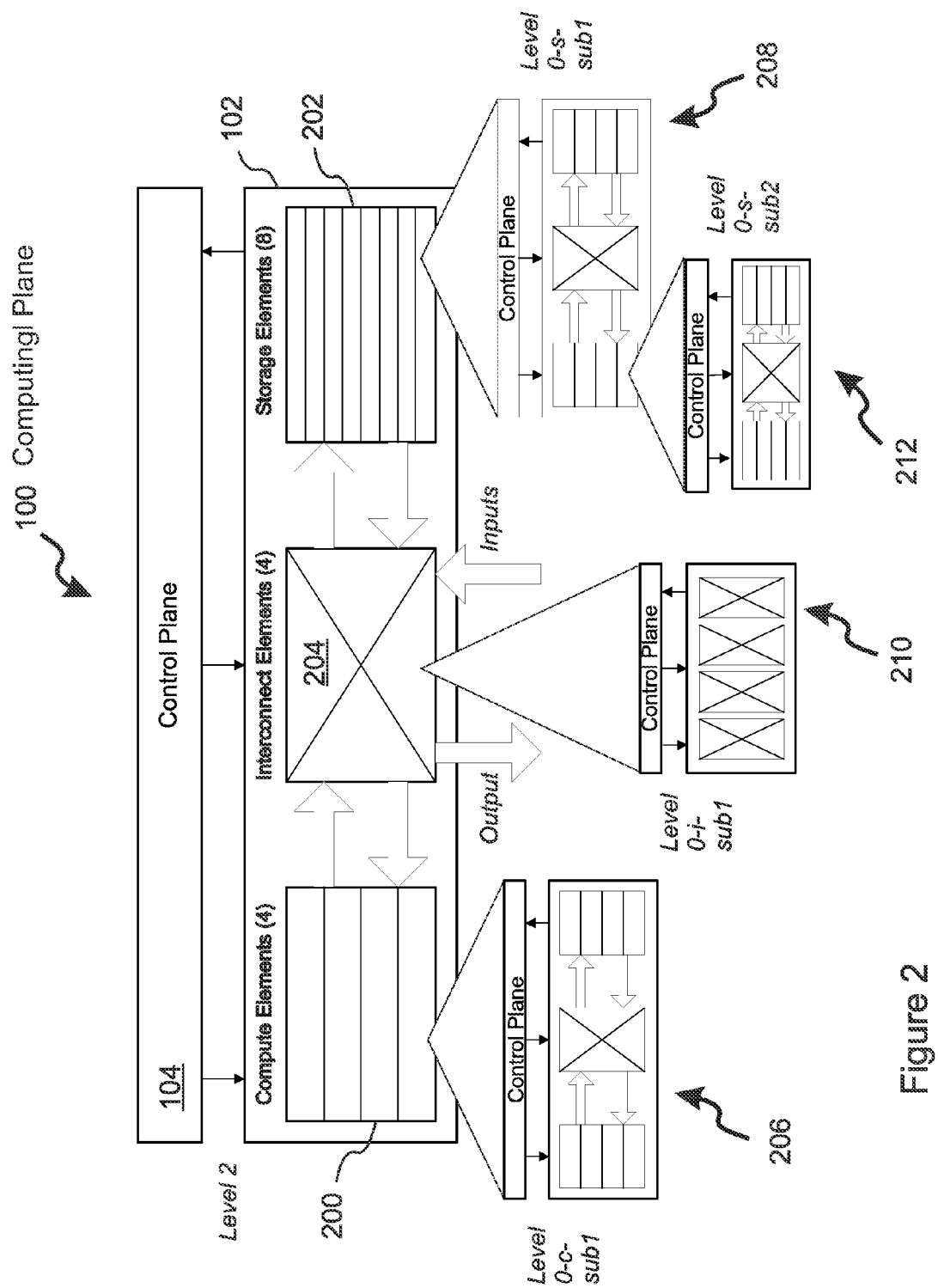
FIG. 2 is a functional diagram illustrating the structure of a data path in an embodiment of the present invention.

FIG. 2 illustrates the structure of a specific Level 0 computing plane design (commonly known as a single "core") in an embodiment of the present invention. Each computing plane 100 includes its own control plane 104 and datapath 102. The datapath 102 includes up to three types of elements, compute elements 200, storage elements 202, and interconnect elements 204.

Compute Elements 200 provide the functionality of computing data output based on data input. In embodiments, at least some of the compute elements can have internal buffer registers as temporary storage for storing intermediate results if needed. Each compute element 200 can consume up to a fixed number of data bits as inputs from the interconnect elements 204. Each compute element 200 can produce up to a fixed number of data bits as outputs to the interconnect elements 204.

The storage elements 202 provide the functionality of data reads and writes. In some embodiments the storage elements 204 can also include simple data processing. Each storage element 202 can store up to a fixed number of data bits in local memory or registers. Each storage element can retrieve up to a fixed number of data bits from local memory or registers. In embodiments, the computation capability included in storage elements 202 is used to compute addresses from data reads and writes, and/or to perform simple data processing on data such as rounding, saturation, and adding or subtracting of two consecutive data bytes or words as the data is transferred to or from memory.

Each interconnect element 204 provide the functionality of establishing connections between two other elements, for example between a compute element 200 and a storage element 202, or between two storage elements 202. In various embodiments the interconnect elements 204 can form static connections (i.e. a wire connection between two ports) and/or dynamic connections (i.e. connections from different sources or to different destinations at different cycles). In some embodiments, the static or dynamic connections provide flow control features.

As is indicated in FIG. 2, the functionality of at least some of the compute elements 200, storage elements 202, and interconnect elements 204 can be provided by separate computing planes 206, 208, 210 in sub-levels, and the functionality of at least some elements in these separate computing planes 208 can in turn be provided by further computing planes 212 in lower sub-levels.

Figure 3:
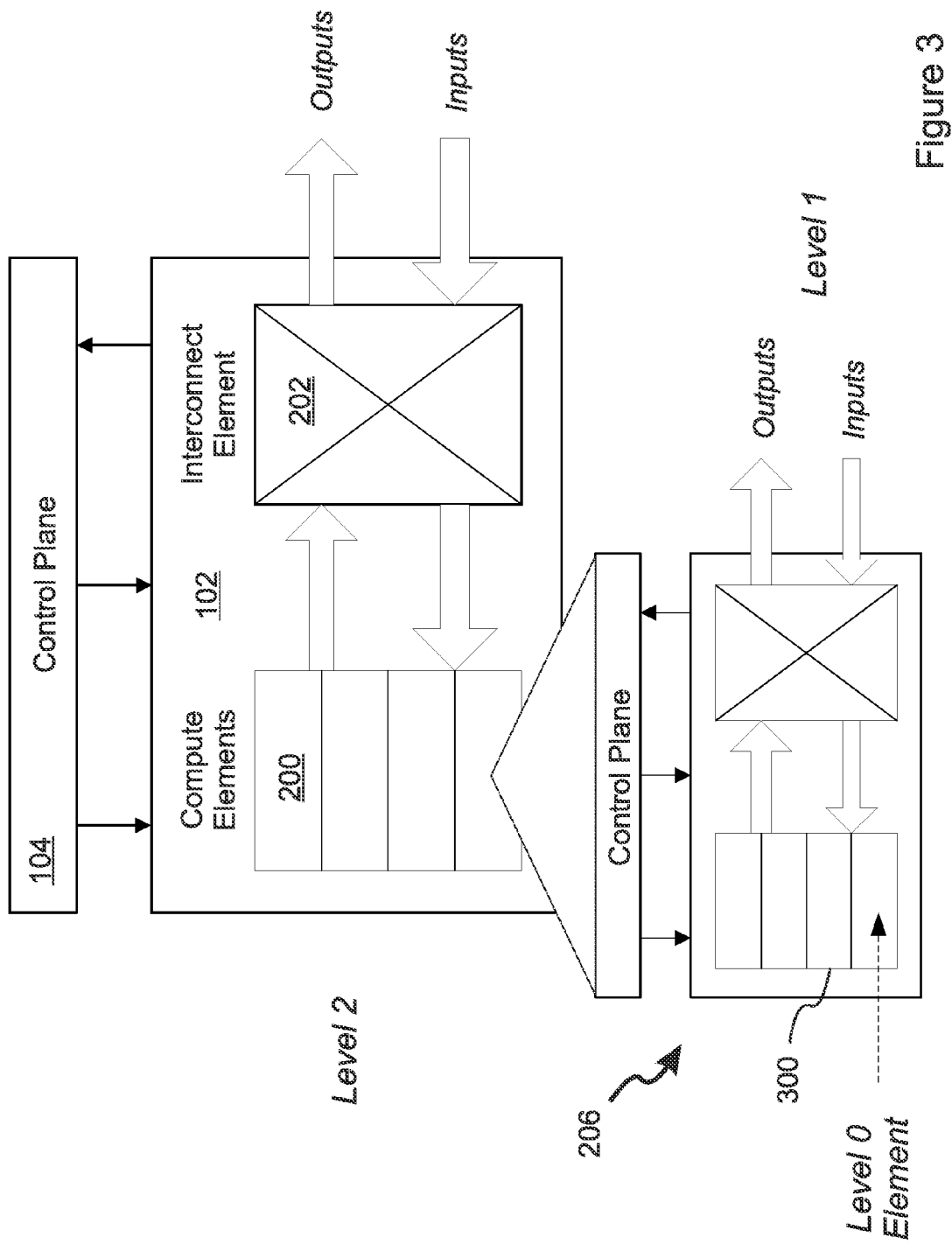
FIG. 3 is a functional diagram illustrating a computing plane in a lower level providing the functionality of an element of a data path in a higher level in an embodiment of the present invention.

FIG. 3 illustrates how a plurality of level 0 elements 300 can be combined to compose a single level 1 computing plane 206, and how multiple level 1 computing planes 206 can be combined to compose a single level 2 element 200.

A second general aspect of the present invention is a method for efficiently programming the multi-core processor described above. To implement an application algorithm, a hierarchical decomposition process is applied that successively partitions a large algorithmic function into sub-functions with data flow between them and associated flow control.

Figure 4:
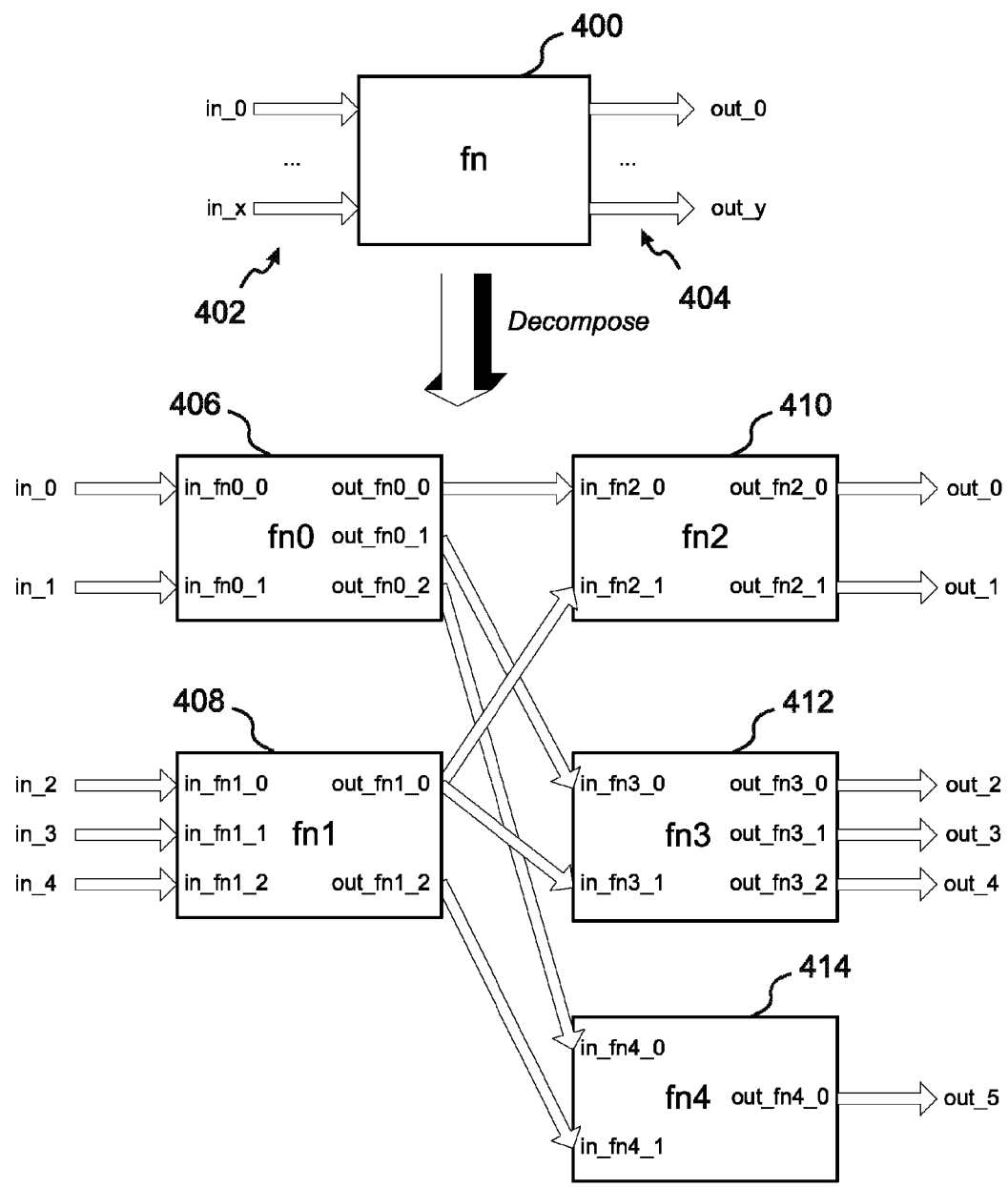
FIG. 4 is a functional diagram illustrating the decomposition of a function into a plurality of sub-functions in an embodiment of the present invention.

FIG. 4 illustrates how an application algorithm function fn 400 with x+1 inputs 402 and y+1 outputs 404 is decomposed in an embodiment of the present invention into five sub-functions fn0 406, fn1 408, fn2 410, fn3 412, and fn4 414 (x=4, y=5). This decomposition process can then be repeated separately for each of fn0 406, fn1 408, fn2 410, fn3 412, and fn4 414. In embodiments, this successive and iterative decomposition process can be carried out by an automatic software tool, until sub-functions are reached at the lowest level that can be mapped to a group of programmable hardware resources in the processor design. The software tool finds efficient mappings of sub-functions to executable programs on the target group of hardware resources within a reasonable search time. This is discussed in more detail below.

Figure 5:
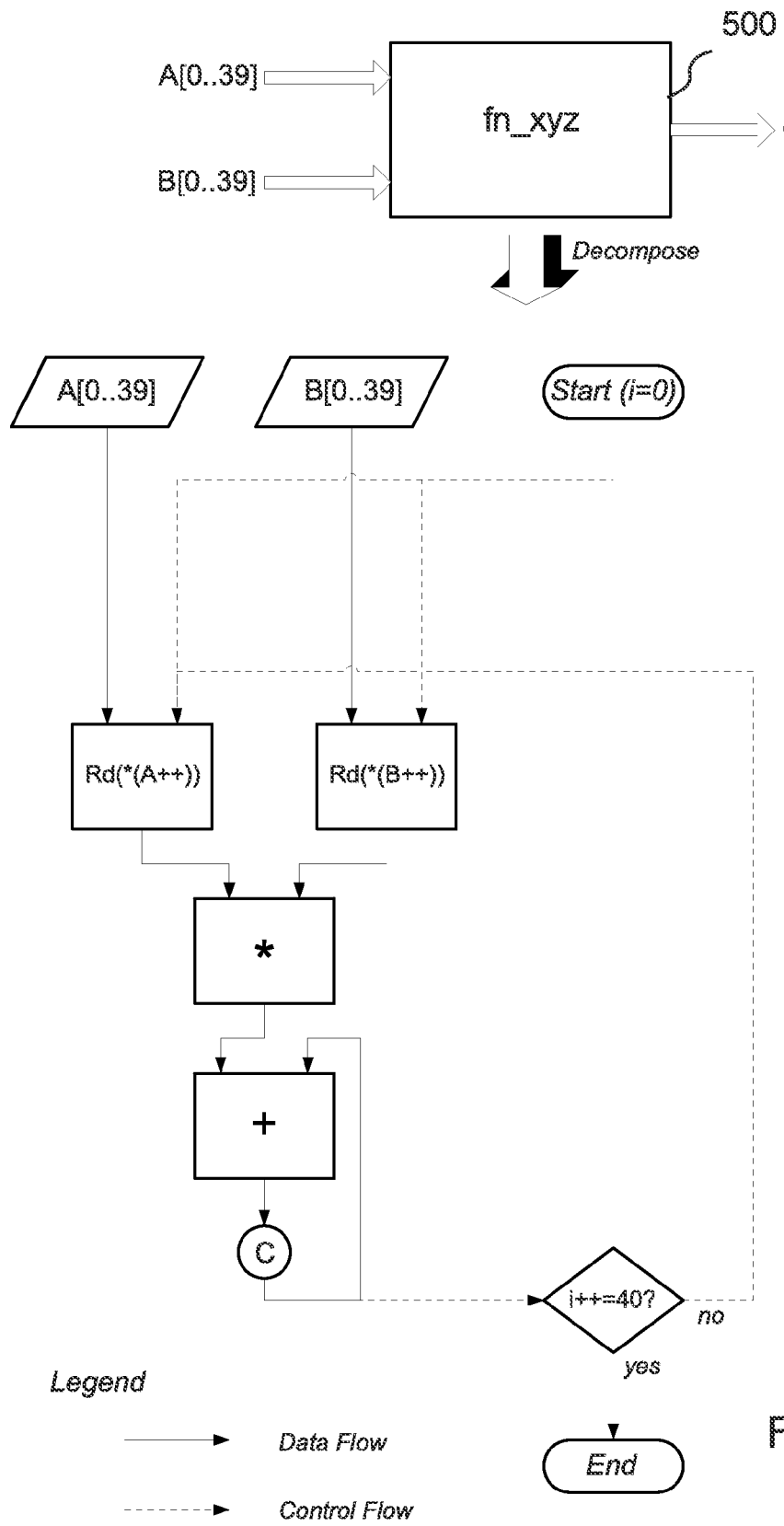
FIG. 5 is a functional diagram illustrating the decomposition of a function into sub-functions that are related by a loop operation, the execution time being independent of the data.

FIG. 5 illustrates the decomposition of a function fn_xyz 500 into specific basic arithmetic operations and associated data flow along with the control flow that reflects a loop operation.

In embodiments, the decomposition process is based on algorithm profiling and target hardware design for mapping. The process has certain constraints (as discussed in more detail below) but mostly relies on heuristics rather than precise steps. As is also discussed in more detail below, the decomposition and succeeding procedures can be iterated to improve efficiency towards reaching a final mapping of an application algorithm. The iterative process determinates when the final mapping achieves a target performance criterion such as a delay below a specified maximum delay or a throughput above a minimum specified throughput.

In general, the computation complexity at each level of decomposition should have a good match with the hardware capability at the corresponding level of the processor hardware design. During the decomposition process, the following properties of each sub-function at each level of decomposition should be captured for use in mapping:

inputs—batch size and input source for each input of the sub-function;

outputs—batch size and output destination for each output of the sub-function; and data dependency of execution time, i.e. whether the execution time can be dependent on the input data based on an algorithm analysis.

Figure 6:
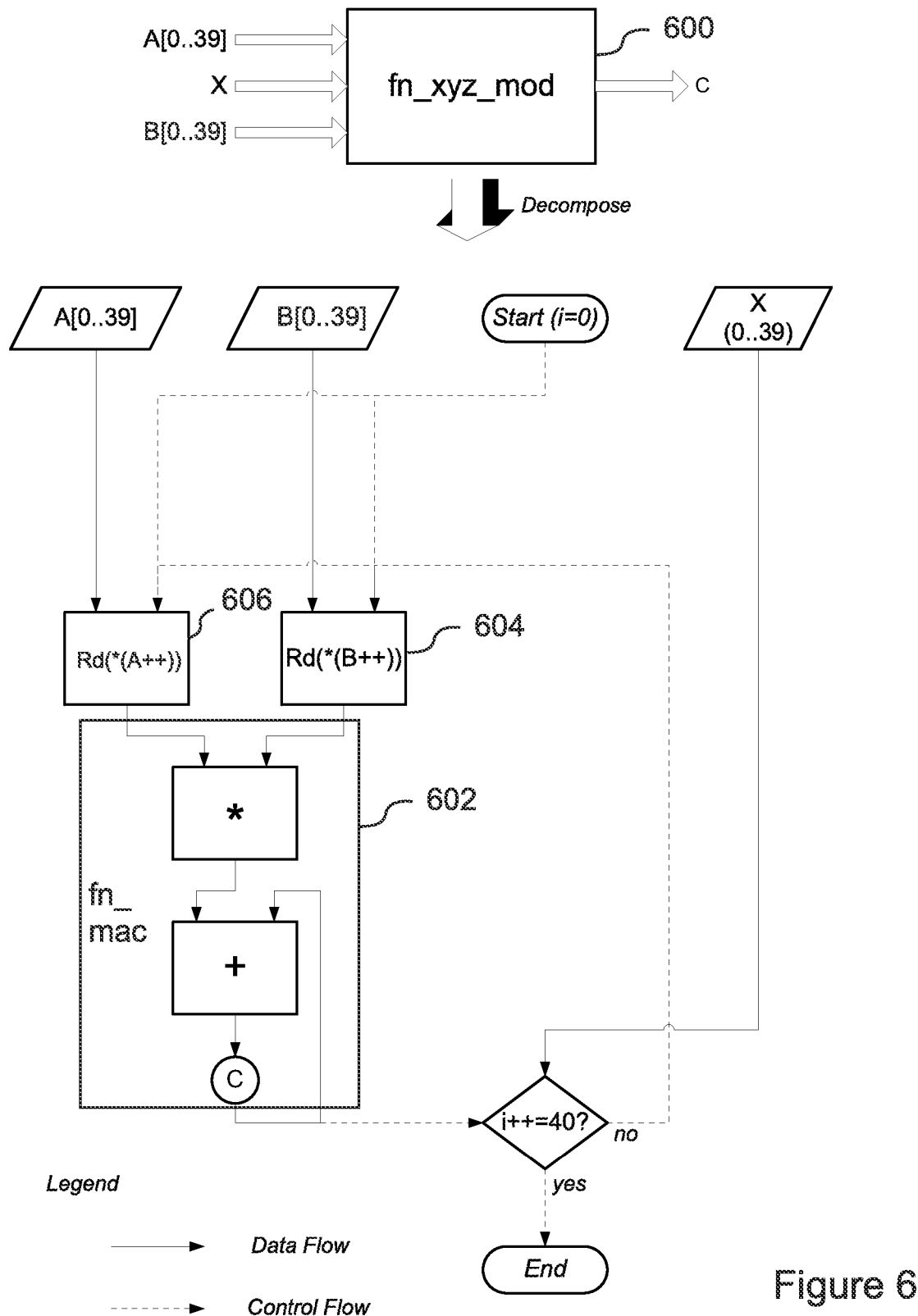
FIG. 6 is a functional diagram illustrating the decomposition of a function into sub-functions that are related by a loop operation, the execution time being dependent of the data.
Figure 7:
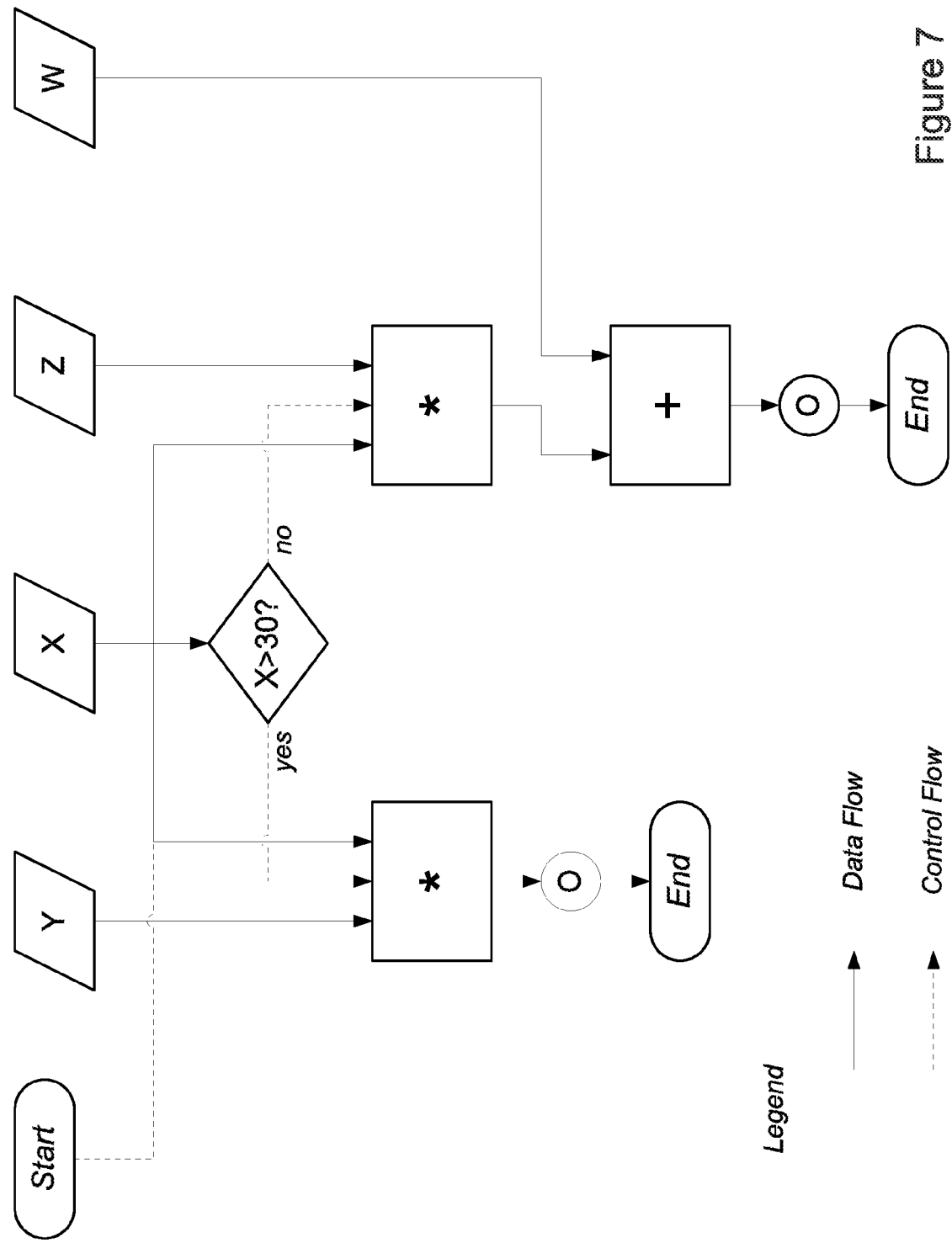
FIG. 7 is a functional diagram illustrating a sub-function for which insertion of null operations can provide a fixed execution time.

For certain algorithm functions, the amount of computation to be performed is dependent on the values of at least some of the input data. For these functions, the execution time can be dependent on the input data as well. FIG. 6 and FIG. 7 illustrate two examples of such functions. Note that FIG. 6 is a slightly modified version of FIG. 5, with the loop count being dependent on input X.

Sometimes it is possible to eliminate a data dependency of an execution time by appending null operations to the sub-function, but this reduces hardware efficiency. For example, an executable program can be produced for the function in FIG. 7 by inserting null operations into the left branch so that the two branches have equal execution time.

At the decomposition stage, it is important to note the possibility of data dependency of execution times, such that later mapping steps can make decisions based on such properties. It is also important that any sub-function having a data dependent execution time be further decomposed into sub-functions without such dependencies and having corresponding control flow. This is illustrated in FIG. 6, where the function fn_xyz_mod 600 is decomposed to fn_mac 602, the two Rd functions 604, 606 and the control flow for the loop.

Table 1 below shows the properties of fn_xyz 500 in FIG. 5 (assuming it is placed in the place of fn4 414 in FIG. 4). Table 2 below shows the properties of the sub-function fn_mac 602 of fn_xyz_mod 600 in FIG. 6.

TABLE 1

| Inputs | Batch Size | Source |
|---|---|---|
| A | 40 | fn0 |
| B | 40 | fn1 |

| Outputs | Batch Size | Destination |
|---|---|---|
| C | 1 | out_5 |

| Data Dependency of Execution time |
|---|
| No |

TABLE 2

| Inputs | Batch Size | Source |
|---|---|---|
| *(A++) | 1 | Rd(*(A++)) |
| *(B++) | 1 | Rd(*(B++)) |

| Outputs | Batch Size | Destination |
|---|---|---|
| C | 1 | fn_mac* |

| Data Dependency of Execution time |
|---|
| No |

*Feedback

To compile an application program for a traditional pipeline processor, the program is decomposed into many sequential operation steps. Data flow between different steps assumes a shared storage data flow model. Each of the decomposed operation steps occupies a time slot which is the cycle that the corresponding instruction is issued into the processor pipeline.

With the flexible and hierarchical architecture of the present invention, an application program is hierarchically decomposed. At each level of decomposition, each of the decomposed sub-functions is allocated a time slot and a group of programmable hardware resources at a specific level of the processor architecture. Each sub-function is also assigned a time slot as a portion of the control sequence for the control plane at the same level with the associated execution time. This allocation process is iteratively repeated until the last level of decomposition is reached.

The allocation of time slots and hardware resources to different sub-functions should match the relative computational and data flow complexities of the sub-functions. The principle for the allocation is load balancing (i.e. to create an equal distribution of tasks between resources). In general, the allocation of time slots and hardware resources needs to be iterated so as to achieve load balancing.

FIG. 8 shows an example of time and resource allocation wherein functions fn0 800 and fn2 802 are allocated to the same resource 100 during different time slots.

When the lowest level decomposed sub-function is allocated to a time slot and a group of hardware resources, each sub-function has to be mapped to a set of executable programs for the allocated hardware resources.

The scheduling process will always start with a sub-function having a deterministic or non-data-dependent execution time. When the sub-functions are scheduled with fixed execution times, they can be combined with control flow to compose functions with data-dependent execution times. The data-dependent execution times can then be estimated based on the input data range and the associated control flow. Estimation of an upper bound, a lower bound, and/or a distribution of execution times is usually desirable.

The inputs of the scheduler are:
Description of the allocated hardware resources
    The compute, interconnect and storage operations that can be performed each cycle by the resources.
    Constraints of the hardware resources such as program storage
The data flow and control flow graph for a sub-function.
    The graph should include only basic operations matching the target hardware resources. The graph specifies the processing of a single batch of input data.
Timing of input availability
    By default, all inputs are available at cycle 0, but based on scheduling of other functions, one or more inputs can be available later than the first input becomes available (assume at cycle 0)
Objective for scheduling—This can be
    Minimize program length
    Minimize batch processing delay
    Maximize batch processing throughput The most important output of the scheduler is the executable programs. In addition, the following are also important outputs of the scheduler to be used for composing multiple sub-functions to form larger functions:
    the delay of the program, Tdelay, which is defined as the time (or cycle) when the last output is produced (i.e. end of the program), assuming the program starts execution at cycle 0;
    the throughput of the program, Tnext, which is defined as the time (or cycle) when the program can start processing of the next batch of input data, assuming the processing of the current batch starts at cycle 0;
    the timing of the output availability, which can be used as the timing of the input availability for other functions; and
    the scheduler performs the task of scheduling each data flow and control operation to a specific cycle, subject to input availability, data dependency in the flow graph, resource availability every cycle, hardware structural constraints, and overall storage constraints for data and program.

The scheduler will utilize a search algorithm with these constraints and the chosen objective as the optimization target.

The output of the scheduler will be an executable sequence of operations that the allocated hardware resources can perform. In general, this executable program can be divided into three portions:

- A prologue at the beginning of the execution during which the pipeline stages of the allocate hardware resources are NOT fully utilized to execute this portion of the operations sequence. This is typically the time it takes to load the pipeline.
- A kernel that starts with a cycle during which the pipeline stages of the allocated hardware sources are fully utilized and end with a cycle of the same characteristic. This is typically the steady state of the execution.
- An epilogue at the end of the execution during which the pipeline stages of the allocate hardware resources are NOT fully utilized to execute this portion of the operations sequence. This is typically the time it takes to drain the pipeline.

Figure 9A:
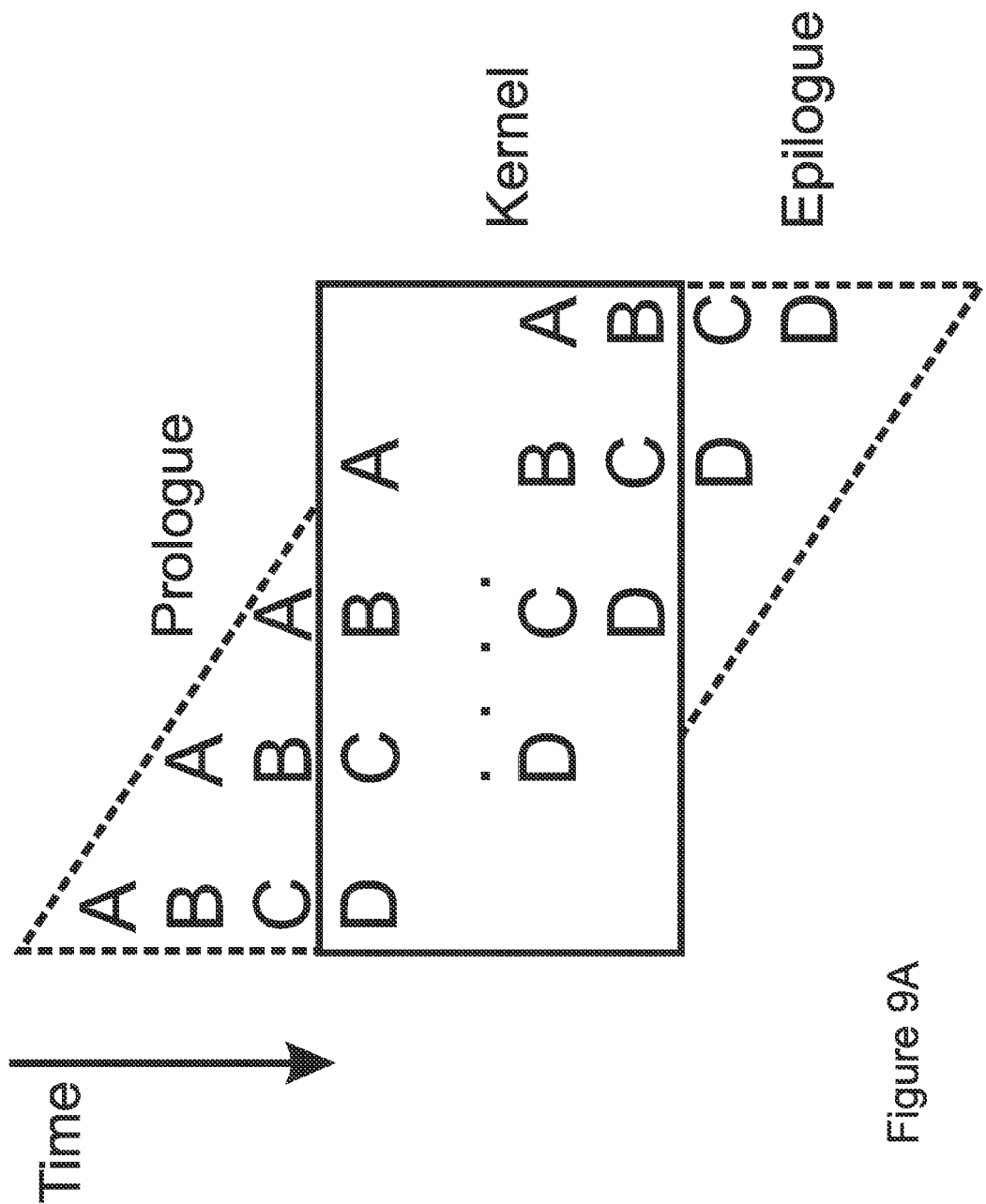
FIG. 9A is a functional diagram illustrating the prologue, kernel, and epilogue of a pipeline function.

For example, for a loop with each iteration containing operations A, B, C, and D that can be mapped to execution over 4 cycles on 4 independent hardware pipeline stages, the execution of the whole loop can be viewed as illustrated in FIG. 9A.

The definition of prologue, kernel, and epilogue apply to general execution of a program, not just for loops. Prologue and epilogue execution can be combined with execution of other functions to shorten overall execution. The start cycle and end cycle of the kernel during all the pipeline stages for the allocated resources are used indicate the time point beyond which no combination of execution can be done. If the execution of a sub-function never uses all the pipeline stages for the allocated resource, then by definition the execution includes only a prologue portion.

The delay of the program, Tdelay, which is defined as the time (or cycle) when the last operation is completed (i.e. end of the program), assuming the program starts execution at cycle 0 is the sum of execution time for all parts, i.e. Tdelay=Tprologue+Tkernel+Tepilogue.

When sub-functions at the lowest level of decomposition are mapped, they need to be composed into larger functions using the resources of the hardware design as described above. There are three main mechanisms for the composition of sub-functions:

- Sequential Composition;
- Concurrent Composition; and
- Pipelined Composition.

Sequential Composition

Figure 9B:
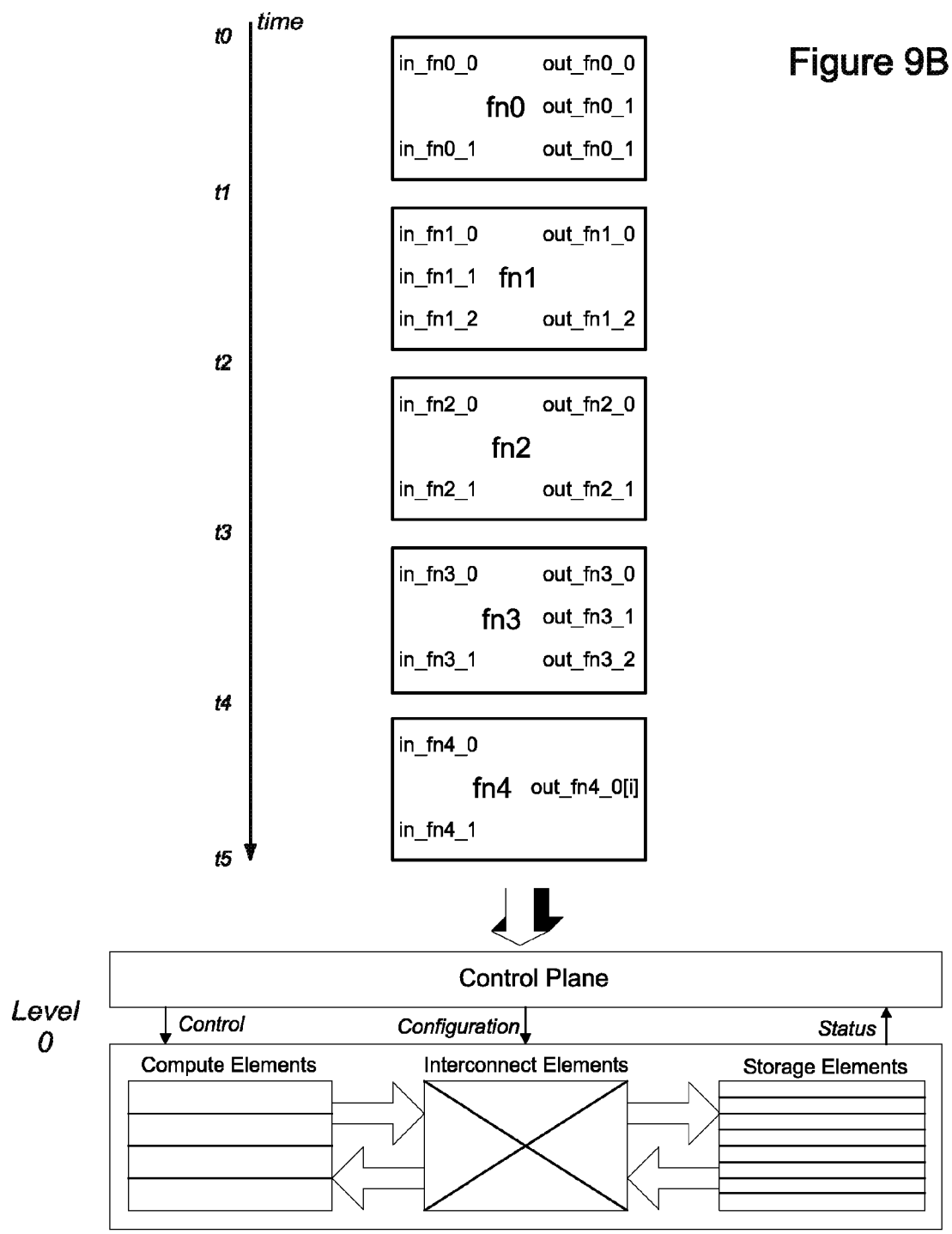
FIG. 9B is a functional diagram illustrating a plurality of sub-functions sequentially composed so as to be executed in consecutive time slots for processing the same batch of input data.

Sub-functions can be sequentially composed by executing them in consecutive time slots for processing of the same batch of input data. FIG. 9B shows an example of sequential composition. For a single level of decomposition, this is equivalent to the sequential execution of instructions in traditional single-core processors. For the decomposition process currently discussed, each sub-function can be further decomposed with the same or another mechanism at the next level. This process can be repeated until the lowest level is reached.

For sequentially composed sub-functions, all data flows are achieved through shared storage. The initial state of the current sub-function (i.e. input data in storage) is the end state of the preceding sub-functions (i.e. output data in storage). For sub-functions without a preceding sub-function, the initial state is system input in storage.

For a sequentially composed function, the Tdelay of the composed function as defined above can be computed as the sum of Tdelay for all sub-functions in the sequential composition. With reference to the examples shown in FIG. 9B, $$Tdelay(fn)=Tdelay(fn0)+Tdelay(fn1)+Tdelay(fn2)+Tdelay(fn3)+Tdelay(fn4)$$

In some embodiments, however, when two sub-functions fna and fnb form a sequential composition fn_ab, a scheduling tool can be used to determine whether the epilogue of fna can be combined with the prologue of fnb and the time of overlap Toverlap(fna,fnb). The key to overlapping execution of epilogue and prologue is non-overlapping resource usage between the two. Then for fna, the time to load the next batch of processing which is fnb is:

$$Tnext(fna)=Tprologue(fna)+Tkernel(fna)+Tepilogue(fna)-Toverlap(fna,fnb)$$

and the delay for the composed function fn_ab is $$Tdelay(fn\_ab)=Tprologue(fna)+Tkernel(fna)+Tepilogue(fna)-Toverlap(fna,fnb)+Tprologue(fnb)+Tkernel(fnb)+Tepilogue(fnb).$$

The time to load the next sub-function for fn_ab or fnb will depend on the prologue of the sub-function to be executed in the next time slot:

$$Tnext(fna)=Tprologue(fna)+Tkernel(fna)+Tepilogue(fna)-Toverlap(fna,fna)$$

Concurrent Composition

Figure 10:
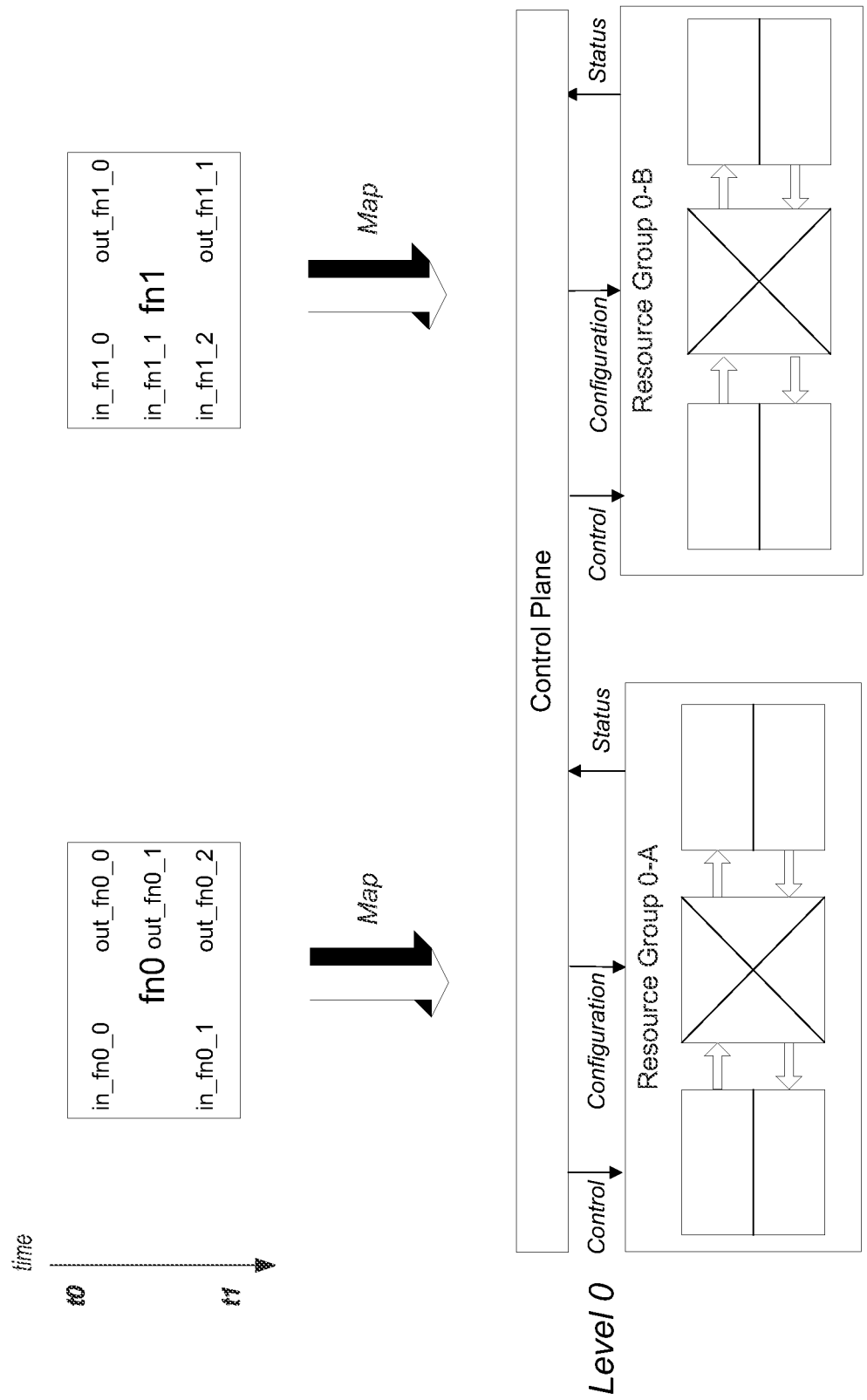
FIG. 10 is a functional diagram illustrating concurrent composition of two sub-functions.
Figure 11:
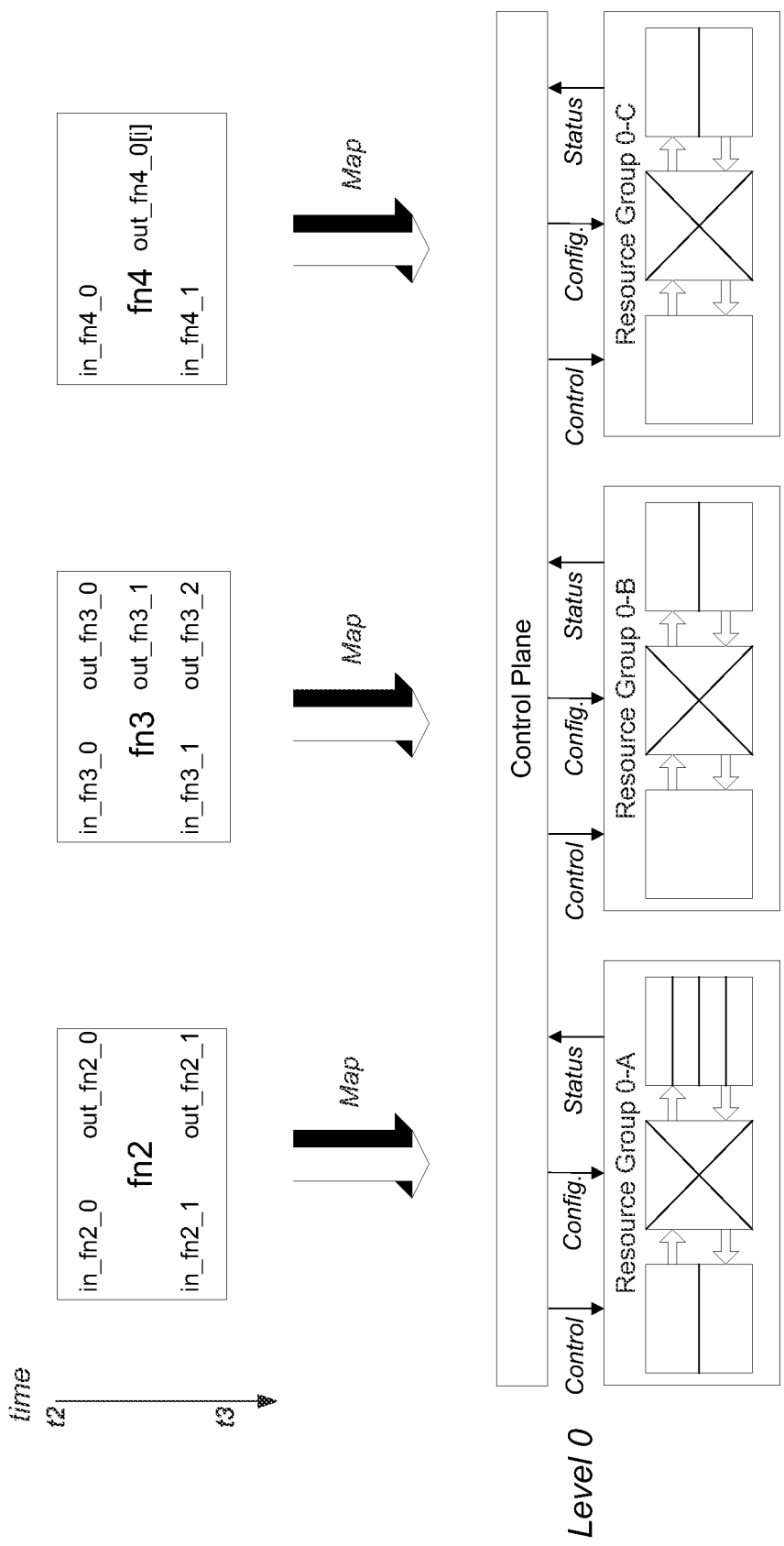
FIG. 11 is a functional diagram illustrating concurrent composition of three sub-functions.

Sub-functions can be concurrently composed by executing them in parallel in different groups of hardware resources for processing of the same batch of input data. FIG. 10 and FIG. 11 show examples of concurrent composition.

For a concurrent composition, the sub-functions have to be independent of each other. There should be no data or control interdependency between them.

For a concurrently composed function, the Tdelay of the composed function as defined above can be computed as the maximum Tdelay of all of the sub-functions in the concurrent composition.

For the example illustrated in FIG. 10

$$Tdelay(fn\_01)=\max(Tdelay(fn0),Tdelay(fn1)),$$

and for the example illustrated in FIG. 11

$$Tdelay(fn\_234)=\max(Tdelay(fn2),Tdelay(fn3),Tdelay(4)).$$

For a concurrent composition of two sub-functions fna and fnb the kernel of fn_ab is the overlapping time period of the fna kernel and the fnb kernel. (i.e. the period where both sub-functions are in their kernel periods). The time period betsween 0 and Tdelay before the composite kernel is defined as the prologue, and the time period between the end of the kernel and Tdelay is defined as the epilogue. In some embodiments the prologue, epilogue and kernel as so defined can be used by a scheduling tool to determine overlapping execution in further sequential and pipeline compositions.

Closely Coupled Concurrent Threads

Two sub-functions fna and fnb in a concurrent composition are defined to be closely coupled concurrent threads if Tdelay(fna) and Tdelay(fnb) are equal to each other and are equal to a constant (i.e. the execution delay is non-data-dependent).

For closely coupled concurrent threads, if their start time is synchronized, their end time is also synchronized by the construction of the executable program by the scheduler. No control sequences for the two threads are necessary to keep them in synchronization at the end of the execution.

Loosely Coupled Concurrent Threads

Two sub-functions fna and fnb in a concurrent composition are defined to be loosely coupled concurrent threads if Tdelay (fna) is not equal to Tdelay(fnb).

If both Tdelay(fna) and Tdelay(fnb) are constants (i.e. non-data-dependent), one of the programs can be padded with null operations to make Tdelay(fna)=Tdelay(fnb). The two threads will then be closely coupled, but at the cost of some loss in hardware efficiency.

If either Tdelay(fna) or Tdelay(fnb) is data dependent, then the two sub-functions, or "threads" are always loosely coupled. If the end points of the two threads need to be synchronized, the control plane that controls the two threads will need to monitor the end-of-program signals provided by each of the threads. When both signals are received, the control plane can send out control signals to related hardware resources to establish a common time reference (i.e. synchronize them).

Assume the two concurrent compositions fn_01 and fn234 in FIG. 10 and FIG. 11 respectively utilize the same hardware resource group. If fn_01 and fn_234 are sequentially composed, the end point of fn_01 will need to be synchronized so that reconfiguration of the hardware from two groups to three groups can be performed. If fn0 and fn1 are closely coupled concurrent threads, no synchronization procedure will need to be written, since the flow of the codes into the next section will be synchronized automatically. If fn0 and fn1 are loosely coupled concurrent threads, a synchronization procedure at the end of fn0 and fn1 will be necessary.

Pipeline Composition

For application programs that are repeatedly executed for multiple batches of input data, sub-functions can be pipelined if:

there is data flow between the two functions;

the sub-functions are allocated to different groups of hardware resources; and the sub-functions operate in parallel on different batches of input data.

Figure 12:
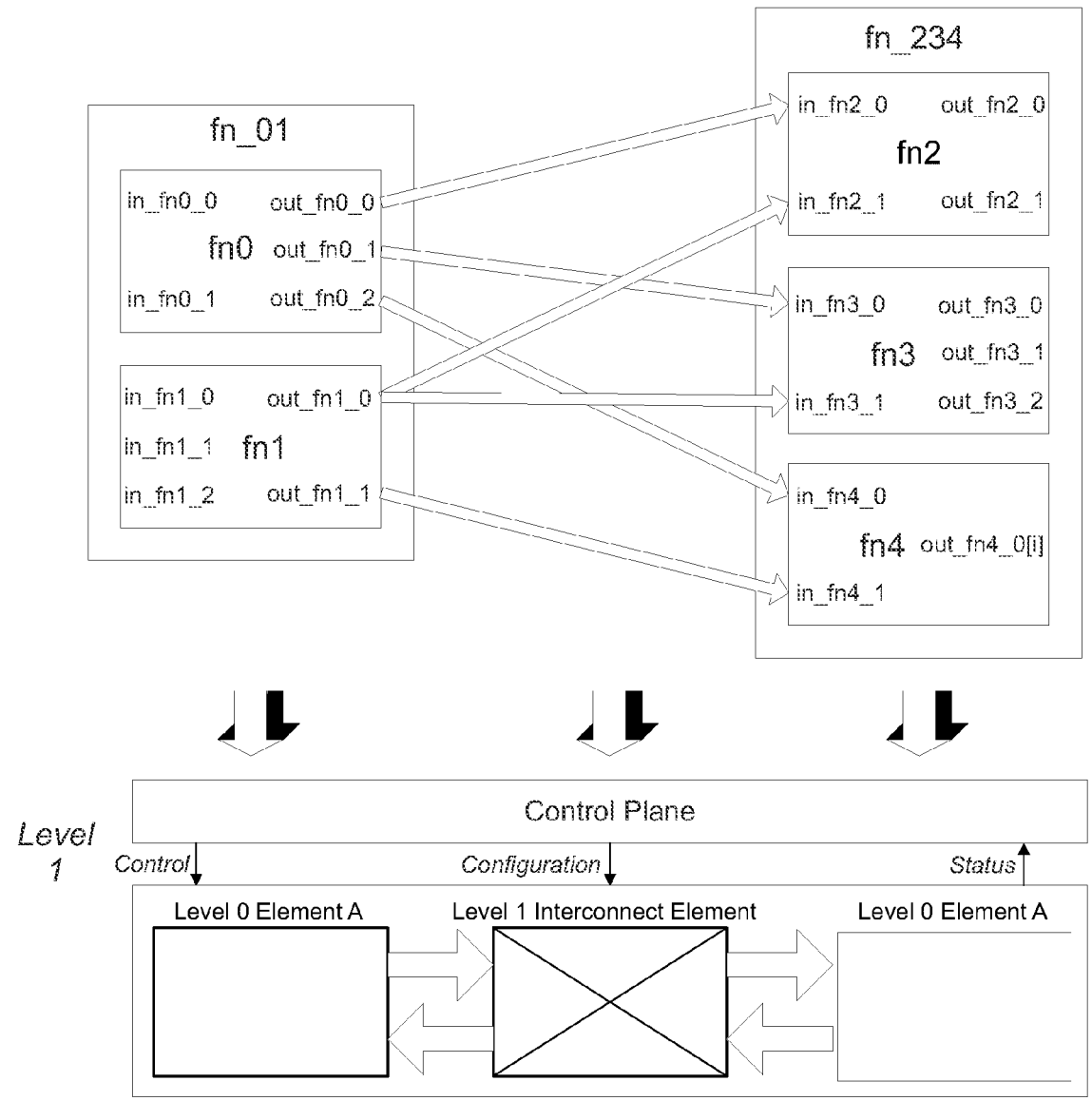
FIG. 12 is a functional diagram illustrating two groups of sequentially composed sub-functions having been further composed in a pipelined composition.

For example, if fn_01 and fn_234 are sequentially composed as discussed above, they can be further composed in a pipelined composition as shown in FIG. 12.

Assume that the sub-functions fn_01 and fn_234 both have constant throughput (non-data-dependent Tnext), the throughputs are the same (Tnext(fn_01)=Tnext(fn_234)), and all the interconnects that connect fn_01 to fn_234 have constant delays. Then the processing of input data batches B1, B2, . . . , B9 is shown below in Table 3.

TABLE 3

| Time | fn_01 | | fn_234 | | |
| --- | --- | --- | --- | --- | --- |
| Slot | fn0 | fn1 | fn2 | fn3 | fn4 |
| 1 | B1 | B1 | | | |
| 2 | B2 | B2 | B1 | B1 | B1 |
| 3 | B3 | B3 | B2 | B2 | B2 |
| 4 | B4 | B4 | B3 | B3 | B3 |
| 5 | B5 | B5 | B4 | B4 | B4 |
| 6 | B6 | B6 | B5 | B5 | B5 |
| 7 | B7 | B7 | B6 | B6 | B6 |
| 8 | B8 | B8 | B7 | B7 | B7 |
| 9 | B9 | B9 | B8 | B8 | B8 |
| 10 | | | B9 | B9 | B9 |

If two sub-functions in a pipelined composition do not have constant throughputs that are the same, buffer storage is needed for each pair of input and output ports connecting the sub-functions so as to absorb the difference between the rate of data production on the source side and the rate of data consumption on the destination side. Flow control provided by the interconnect channels can be used to adjust the throughput based on the data level in these buffers.

Figure 13:
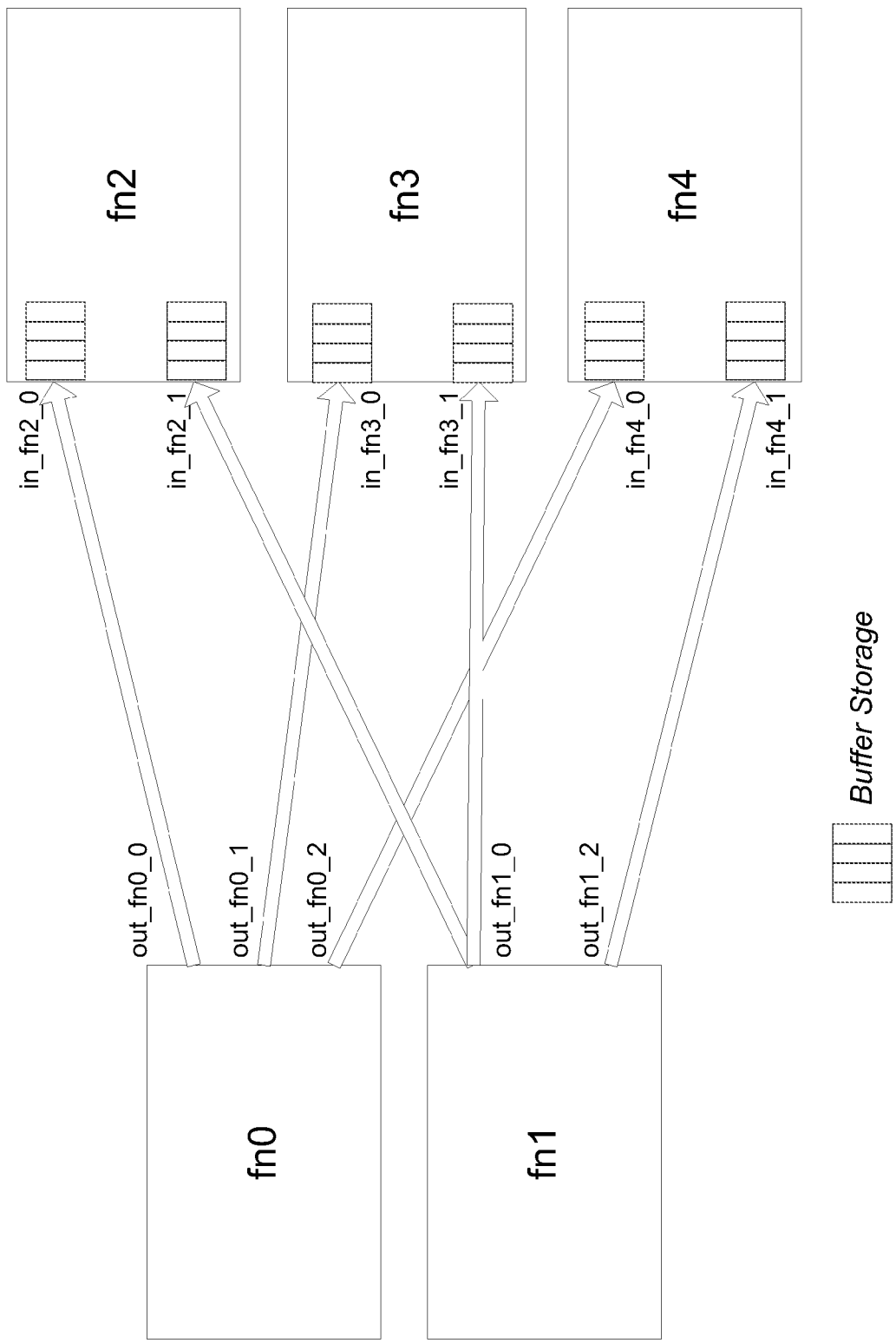
FIG. 13 is a functional diagram illustrating two groups of sequentially composed sub-functions having been further composed in a pipelined composition having five interconnect channels.

The above example can be thought of as a pipelined composition having five interconnect channels, as shown in FIG. 13. Each of the interconnect channels should have up to two buffer storage elements, as shown in the figure.

Figure 14:
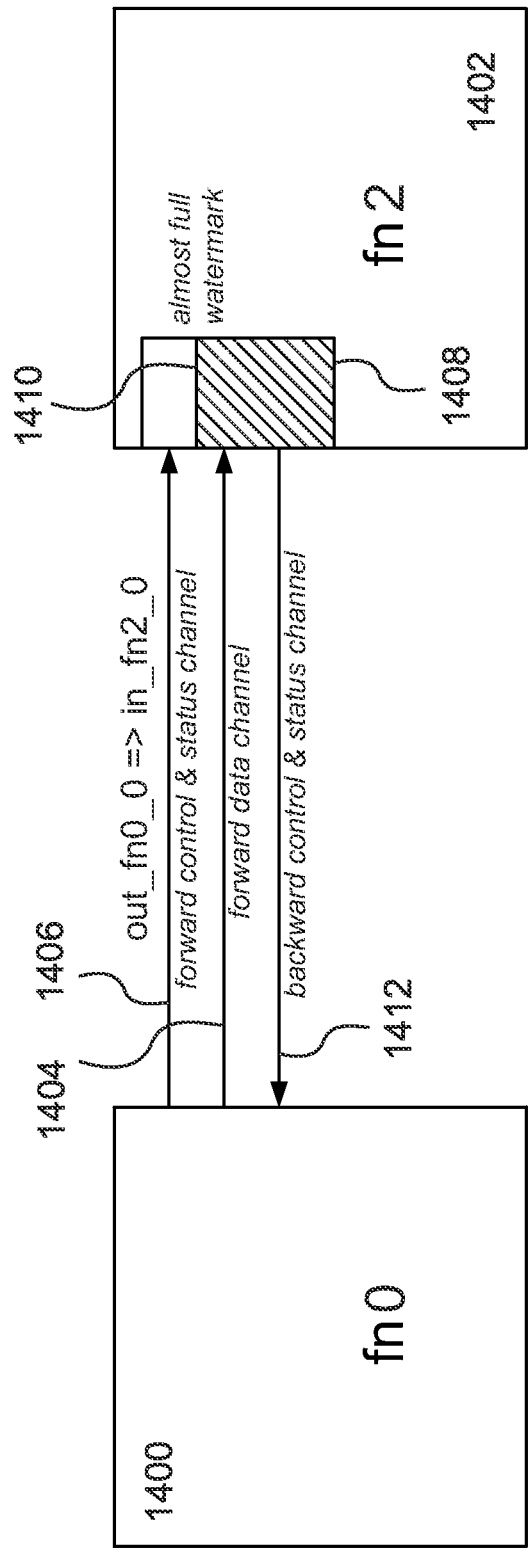
FIG. 14 is a functional diagram illustrating the flow control mechanism for an interconnect port between two sub-functions, whereby data flow is suspended when a buffer storage in one of the sub-functions is filled to an "almost full" watermark.

FIG. 14 shows the flow control mechanism for an interconnect port from out_fn0_0 1400 to in_fn2_0 1402. The forward data channel 1404 will be used to transmit each new batch of output. Each batch will be accompanied with a "data valid" status on the forward control and status channel 1406. When the new batch signified by the "data valid" status is received by fn2 1402, it will be written into the receive buffer 1408. The buffer has an "almost full" watermark 1410. For as long as the stored data in the buffer exceeds the watermark, a "back pressure" signal will be sent back to fn0 1400 on the backward control and status channel 1412. When fn0 1400 receives this "back pressure" signal, it will temporarily stop producing output data until the "back pressure" signal goes away.

In some embodiments, when two sub-functions fna and fnb form a pipeline composition, a scheduling tool can be used to determine the time of overlapping execution of the epilogue and prologue of the same function Toverlap(fna, fna) in a manner similar to what is described above for sequential composition.

Closely Coupled Pipeline Stages

Two sub-functions fna and fnb in a pipelined composition are defined to be closely coupled pipeline stages if Tnext(fna) and Tnext(fnb) are equal to each other and equal to a constant (The execution throughput is non-data-dependent).

For a closely coupled pipelined composition, no flow control is necessary for data flow between the source sub-function and destination sub-fucntion if the following conditions are met:

interconnects used for data flow between the two stages have fixed delays. (i.e. circuit connections are used); and the starting points of fna and fnb have a common timing reference and are adjusted for delay between the two pipeline stages.

Under these conditions, the timing of the sequence is adequate to control the start point of each new data batch. The rate of producing and consuming data is constant, and is adjusted by flow control mechanisms as needed.

Loosely Coupled Pipeline Stages

Two sub-functions fna and fnb in a pipelined composition are defined to be loosely coupled pipeline stages if Tnext(fna) is not equal to Tnext(fnb).

If both Tnext(fna) and Tnext(fnb) are constant (non-data-dependent), it may be possible to extend the length of one of the program to make Tnext(fna) equal to Tnext(fnb). The two threads can then be closely coupled, but at the cost of some loss of hardware efficiency.

If either Tnext(fna) or Tnext(fnb) is data dependent, then the pipeline stages are always loosely coupled. Flow control is then necessary for any interconnect channel from the source pipeline stage to the destination pipeline stage. Assuming fna is the source sub-function and fnb is the destination sub-function, the following are the details of the flow control mechanism expressed in pseudo-code:

For source pipeline stage fna:

```
if (! back_pressue) {
    produce_new_output_batch;
    transmit_new_batch;
}
```

For destination pipeline stage fnb:

```
Receive Input Data:
    if (data_valid_on_input) {
        write_data_to_buffer;
        increment_data_level;
    }
Execute fnb:
    if (! buffer_empty) {
        execute_fnb;
        decrement_data_level;
    }
```

The backward status and control port is statically connected to the flag almost_full, which indicates that data level exceeds the preset watermark.

The size of the buffer required for avoiding loss of data and the watermark setting can be determined based on the source pipeline stage throughput, the destination pipeline stage throughput, the traffic pattern to determine aggregate throughput in case of data-dependent throughput, and the delay of the pipeline stages.

In general, the following are some rules for considering flow control:
- If min(Tnext(fna))>=max(Tnext(fnb)), then backward flow control is not necessary, and the buffer size can also be minimized.
- If average(Tnext(fna))<average(Tnext(fnb)) for a sustained period of time, a proper flow control that is set up to maintain data coherency will result in very poor efficiency, and therefore is not recommended.
- A goal should be that the average(Tnext(fna))≅average(Tnext(fnb)) for good efficiency.

Use of Interconnect Resources

As described above, interconnect resources are required for pipelined compositions. Here are some general rules for selecting different types of interconnect resources:
- for closely coupled pipeline stages, circuit connection is necessary to guarantee fixed transmission delays;
- for loosely couple pipeline stages, both circuit and packet connections can be used with proper flow control;
- for interconnect ports that transmit continuous data flow, circuit connections with proper bandwidth may use system resources more efficiently;
- for interconnect ports that transmit bursts of data flow, packet connections may use system resources more efficiently.

Iteration Process for Complete Application Mapping

For a complete application, especially for an embedded application, there is usually a system-wide performance requirement for the throughput or delay. For example, an application can have a requirement of a throughput of one new batch of input data every 20 ms. In this case, Tnext=20 ms for all system inputs. Also, an application can require that the overall delay for one batch of input processing is 10 ms. In this case, Tdelay=80 ms for the entire system. When system clock cycle is known, these requirements can be easily translated to cycles.

Figure 15:
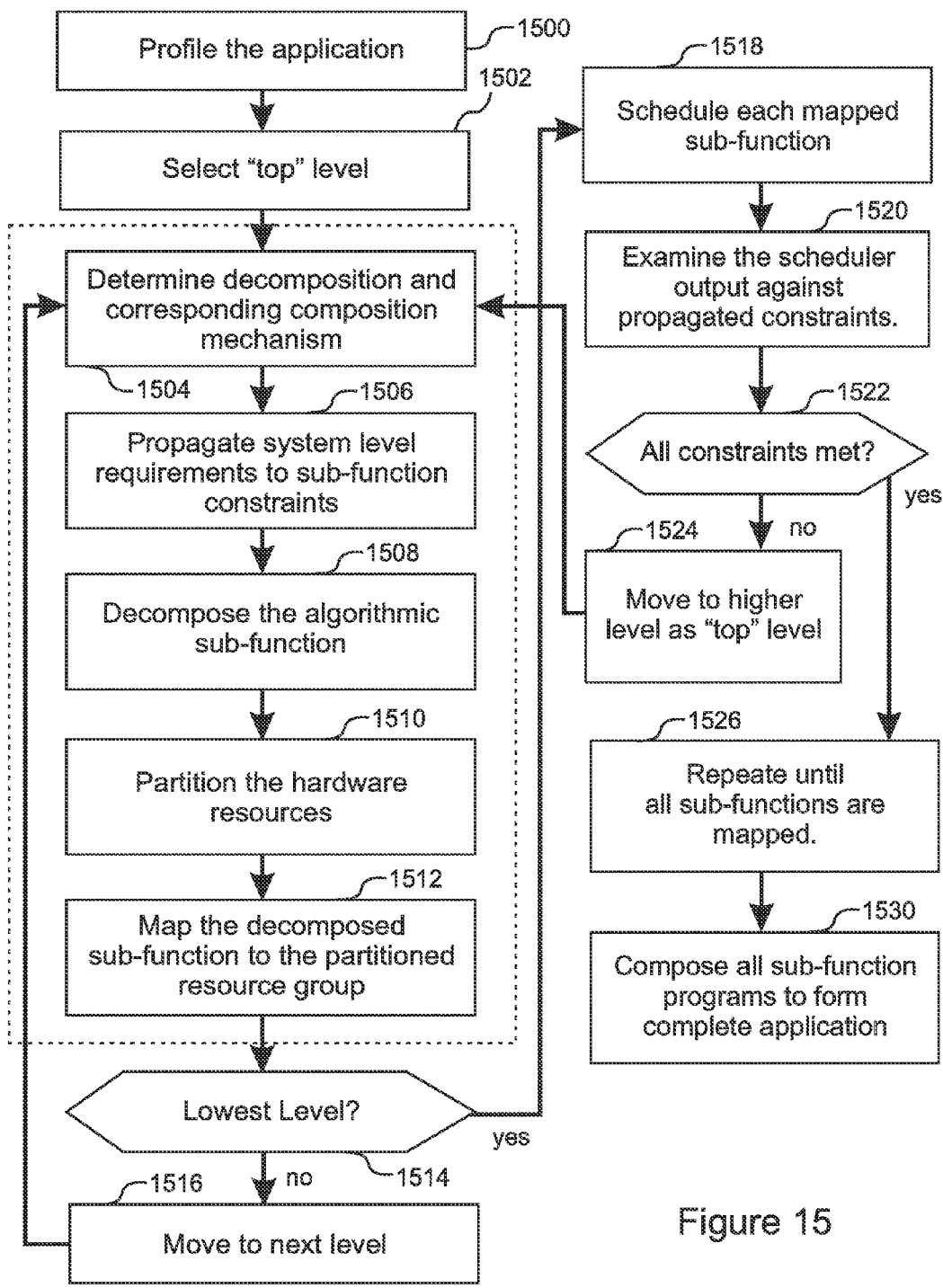
FIG. 15 is a flow diagram that illustrates an iterative process in an embodiment of the present invention of mapping an application onto the processor hardware design of the present invention.

Based on the detailed mechanism described above, embodiments of the present invention use an iterative process of mapping an application to the processor hardware design of the present invention. FIG. 15 is a flow diagram which illustrates an iteration process for complete mapping of an application according to an embodiment of the present invention.

First, the application is profiled 1500 for computation complexity, data flow pattern and possible data dependency of execution time. Then a top-down decomposition and mapping is performed. A "top" level is selected 1502, and the decomposition and corresponding composition mechanisms are determined 1504 as described above based on the profiling 1500. Then the system level requirements are propagated to the sub-function constraints 1506 (e.g. Tnext(System)=20 ms=>Tnext(fn0)=Tnext(fn1)=8000 cycles, Tdelay(System)=80 ms=>max(Tdelay(fn0),Tdelay(fn1))=32000 cycles).

The algorithmic sub-fuctions are decomposed 1508, the hardware resources are partitioned 1510, and the algorithmic sub-functions are mapped to the partitioned resource group 1512. This process is repeated to the lowest level 1514, 1516. Then each mapped sub-function is scheduled for the resource it is mapped to 1518, after which the scheduler output (Tnext, Tdelay) is examined 1520 and compared to the propagated constraints (see 1506). If all constraints are met 1522, then the mapping process is finished. However, if all constraints are not met 1522, then the decomposition 1504, resource partition 1506, and mapping 1508 processing is repeated and iterated starting with the next higher level 1524 and going up (i.e. the steps are repeated with a different "top" level).

Once all constraints are met 1526, all the sub-function programs are composed from the bottom up so as to form the complete, executable program for the entire application 1530.

In various embodiments, the iteration process described above and illustrated by FIG. 15 is guided by heuristics.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A multi-core processor, comprising:
   a plurality of processing cores, referred to herein as computing planes,
   the computing planes being arranged in a hierarchy of levels including a highest level and a lowest level, each of the levels including at least one computing plane,
   each of the computing planes including a control plane and an associated datapath,
   each of the control planes including a sequencing instruction memory that is able to store configuration and control information applicable to its associated data path, the configuration information including instructions that control manipulation and routing of data by its associated datapath,
   each of the control planes being able to receive status information from its associated data path, and being able to provide configuration and control information to its associated data path,
   each of the datapaths including at least one data input, at least one data output, and at least one element, the element being one of a compute element that is able to manipulate data, an interconnect element that is able to route data, and a storage element that is able to store data, and for at least one of the elements that is in a level above the lowest level, the functionality of the element being provided by a computing plane in a level below the level of the element.

2. The processor of claim 1, wherein at least one of the compute elements includes an internal buffer register that is able to provide temporary storage for intermediate results.

3. The processor of claim 1, wherein at least one of the storage elements is able to perform at least one data processing function.

4. The processor of claim 3, wherein the data processing function is one of:
computing an address from data;
rounding of data;
saturating of data; and
adding or subtracting of two consecutive data inputs.

5. The processor of claim 1, wherein at least one of the interconnect elements is able to form a static connection between two other elements.

6. The processor of claim 1, wherein at least one of the interconnect elements is able to form dynamic connections between pairs of other elements, the dynamic connections being changeable under control of the configuration instructions supplied by the control plane.

7. The processor of claim 1, wherein at least one of the interconnect elements includes both a signal transmission channel and a data transmission channel, the signal transmission channel being able to transmit a flow control signal in parallel with data transmitted by the data transmission channel, the flow control signal being usable for controlling timing of the flow of data from the data transmission channel.

8. A method for programming the processor of claim 1 to perform a large algorithmic function by mapping the algorithmic function onto the computing planes of the processor, the method comprising:
partitioning the large algorithmic function into a first layer of sub-functions with data flow between the sub-functions and associated flow control;
if one of the sub-functions is not suitable for mapping onto a computing plane of the processor, partitioning the sub-function into a lower layer of sub-functions having data flow between the sub-functions and associated flow control;
repeating the step of partitioning the sub-functions into lower layers of sub-functions until all of the lowest level sub-functions are suitable for mapping onto computing planes of the processor;
allocating processor time slots and hardware resources to the sub-functions so as to approximately match the processor resources with relative computational and data flow complexities of the sub-functions; and
configuring interconnects of the processor according to the data flows between the sub-functions.

9. The method of claim 8, further comprising configuring at least some of the interconnects for data transmission with flow control so as to maintain synchronicity of data during execution of the algorithmic function.

10. The method of claim 8, further comprising appending null operations to at least one of the sub-functions so as to eliminate a data dependency of an execution time of the sub-function.

11. The method of claim 8, wherein the steps of partitioning the large algorithmic function and partitioning the sub-functions are carried out by an automatic software tool.

12. The method of claim 8, wherein the step of partitioning the sub function includes partitioning any sub-function having a data dependent execution time into sub-functions that do not have data dependent execution times.

13. The method of claim 8, wherein allocating processor time slots and hardware resources to a hierarchy of sub-functions includes:
selecting a level of the processor to be a highest level of allocation to the hierarchy of sub-functions; and
mapping each of the sub-functions in the hierarchy onto a computing plane that is at a level of the processor at the same offset below the highest level as the offset of the sub-function below the highest layer of the sub-functions in the hierarchy.

14. The method of claim 8, further comprising repeating the step of allocating processor time slots and hardware resources so as to achieve load balancing of the hardware resources.

15. The method of claim 8, wherein configuring the interconnects of the processor according to the data flows between the sub-functions includes combining sub-functions having fixed execution times and providing flow control mechanisms so as to compose functions having data-dependent execution times.

16. The method of claim 15, further comprising estimating the data-dependent execution times based on an input data range and the data flow pattern.

17. The method of claim 16, further comprising estimating at least one of an upper bound, a lower bound, and a distribution of the execution times.

18. The method of claim 8, wherein configuring the interconnects of the processor according to the data flows between the sub-functions includes combining sub-functions according to at least one of sequential composition, concurrent composition, and pipelined composition.

19. The method of claim 8, wherein configuring the interconnects of the processor according to the data flows between the sub-functions includes using buffer storage to absorb a difference between a rate of data production of a first element and a rate of data consumption of a second element.

20. The method of claim 19, wherein the buffer storage is configured to produce a "back pressure" signal when an amount of data stored in the buffer storage exceeds a specified watermark amount, the back pressure signal causing the first element to temporarily stop producing output data.

21. The method of claim 8, wherein the step of allocating processor time slots and hardware resources to the sub-functions further includes using a scheduling tool to schedule overlapping execution of sub-function epilogues and prologues when possible.

* * * * *